June 1, 1965 J. H. HUMPHREY 3,187,334

DATA TRANSMITTING AND RECORDING DEVICE AND SYSTEM

Original Filed June 27, 1958 12 Sheets-Sheet 1

INVENTOR.
JOHN H. HUMPHREY

BY

Albert M. Parker

ATTORNEY

DATA TRANSMITTING AND RECORDING DEVICE AND SYSTEM

Original Filed June 27, 1958 12 Sheets-Sheet 2

INVENTOR
JOHN H. HUMPHREY

BY Albert M. Parker
ATTORNEY

DATA TRANSMITTING AND RECORDING DEVICE AND SYSTEM

Original Filed June 27, 1958

INVENTOR.
JOHN H. HUMPHREY

BY
Albert M. Parker
ATTORNEY

DATA TRANSMITTING AND RECORDING DEVICE AND SYSTEM

Original Filed June 27, 1958 12 Sheets-Sheet 4

INVENTOR.
JOHN H. HUMPHREY

BY Albert M. Parker

ATTORNEY

DATA TRANSMITTING AND RECORDING DEVICE AND SYSTEM

Original Filed June 27, 1958

INVENTOR.
JOHN H. HUMPHREY

BY

Albert M. Parker
ATTORNEY

DATA TRANSMITTING AND RECORDING DEVICE AND SYSTEM

Original Filed June 27, 1958 12 Sheets-Sheet 6

INVENTOR.
JOHN H. HUMPHREY
BY
Albert M. Parker
ATTORNEY

June 1, 1965 J. H. HUMPHREY 3,187,334

DATA TRANSMITTING AND RECORDING DEVICE AND SYSTEM

Original Filed June 27, 1958 12 Sheets-Sheet 7

INVENTOR.
JOHN H. HUMPHREY

BY

Albert M. Parker

ATTORNEY

INVENTOR.
JOHN H. HUMPHREY
BY
Albert M. Parker
ATTORNEY

DATA TRANSMITTING AND RECORDING DEVICE AND SYSTEM

Original Filed June 27, 1958

INVENTOR.
JOHN H. HUMPHREY
BY Albert M. Parker
ATTORNEY

DATA TRANSMITTING AND RECORDING DEVICE AND SYSTEM

Original Filed June 27, 1958 12 Sheets-Sheet 10

INVENTOR.
JOHN H. HUMPHREY
BY
Albert M. Parker
ATTORNEY

DATA TRANSMITTING AND RECORDING DEVICE AND SYSTEM
Original Filed June 27, 1958
12 Sheets-Sheet 11
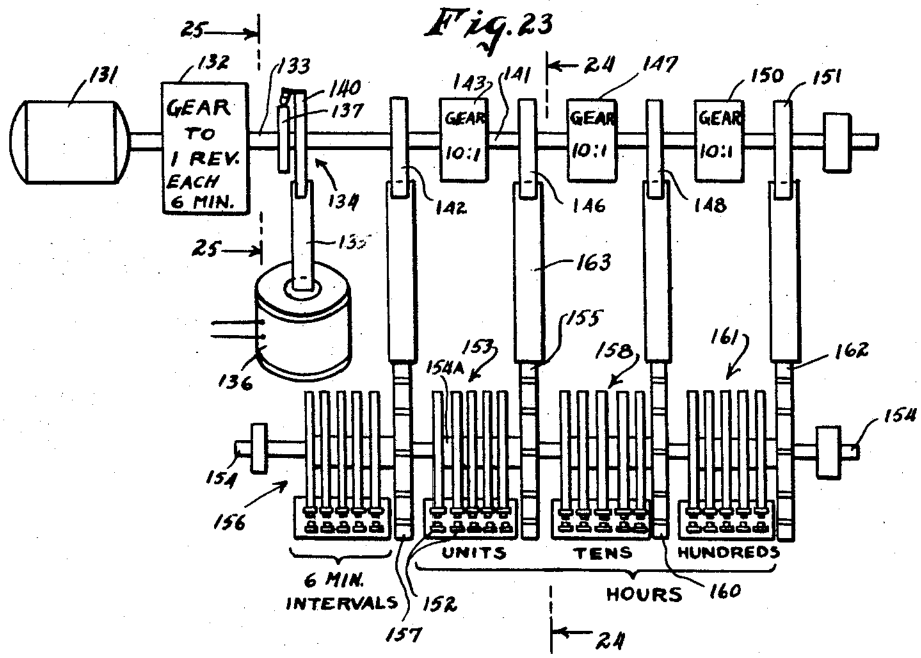
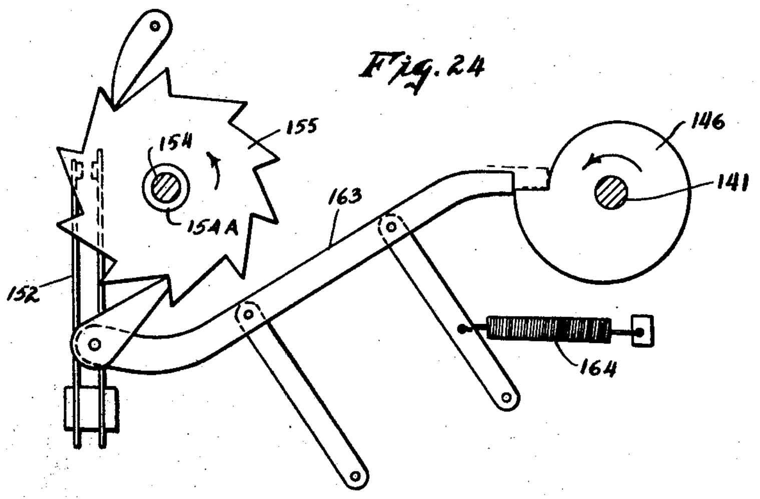
Fig. 25
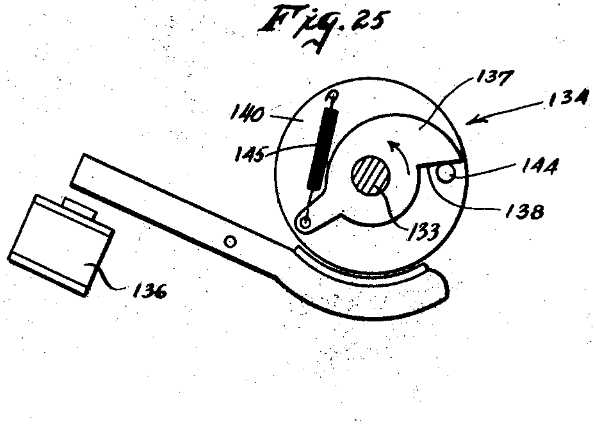
INVENTOR.
JOHN H. HUMPHREY
BY Albert M. Parker
ATTORNEY INVENTOR.
JOHN H. HUMPHREY
BY
Albert M. Parker
ATTORNEY United States Patent Office 3,187,334
Patented June 1, 1965

3,187,334

DATA TRANSMITTING AND RECORDING DEVICE AND SYSTEM

John H. Humphrey, Los Angeles, Calif., assignor, by mesne assignments, to Dashew Business Machines, Inc., Los Angeles, Calif., a corporation of Delaware Continuation of and substitution for abandoned application Ser. No. 745,176, June 27, 1958. This application Apr. 19, 1962, Ser. No. 191,661
20 Claims. (Cl. 346—34)

This invention relates to a data transmitting and recording system which positively assures accuracy of the data transmitted and recorded. It relates specifically to a data transmitting recording device which is used in business establishments, to aid in cost accounting, inventory control, job recording, production control, timekeeping, and payroll accounting.

This application is a continuation of application Serial No. 745,176, filed June 27, 1958, now abandoned, entitled "Data Transmitter," and is substituted therefor.

In manufacturing plants today there is need for a more efficient data handling system which will not only reduce the time consumed in the work of cost accounting but also will help in inventory and production control and give valuable data regarding the employee's time. At present, these items of information are usually obtained by timekeepers or production control clerks who observe and manually record the time consumed and production counts for certain manufacturing operations and also make a note of the material expended so that accountants and clerks may subsequently prepare accounting and other records essential to managing a business. Manual recording has disadvantages; first, because the manual recording of data on paper forms is subject to error; and second, the timekeeper or clerk generally does not have the information available to make a complete record of the entire operation and is dependent upon production workers not properly trained in the accounting needs of the business.

The present invention is operated by the workman himself, thereby eliminating the timekeeper. The employee is identified by a key or other type of metal or permanent data device which he alone holds. The work order, operation, and material or part numbers are also established by similar metal data devices issued to the workman by a foreman or production control employee. The quantity involved is set by the workman in a transmitter and a receiver part of the machine automatically enters the time, the location, and other data which may be permanently set in the machine. Quantities may also be set by the foreman, inspector, or production count or inventory clerk. All the above mentioned data is transferred to a telegraph tape or similar recording mechanism at the central receiver which forms a permanent record of the operation. The telegraph tape may be produced at the receiver in a central office where it may be relayed by telegraph, used to operate a typewriter, converted to punched cards, or fed directly into an electronic data processor. Each of several transmitters may be wired to the central receiver or coupled to it by other means for transmitting information.

One of the objects of this invention is to provide an improved data recording and transmitting system which avoids one or more of the disadvantages and limitations of prior art arrangements.

Another object of the invention is to increase the accuracy of data handling systems by automatically recording considerable data which would otherwise be subject to manual control.

Another object of the invention is to provide a complete machine reproducible record of most of the data necessary for a system of cost accounting, production control, inventory control, and payroll accounting.

Another object of the invention is to make a complete and permanent record which may be reproduced at will by automatic machinery.

Another object of the invention is to record automatically the exact times of starting and stopping operations in such a manner that this recorded data may be processed for accounting purposes.

Another object of the invention is to make a record of the employees' identification, work identification, operation identification, location, part or material identification, rate, account identification, quantity of items produced or otherwise handled, and other essential information.

Another object of the invention is to provide a number of data transmitting stations at various locations, all of said transmitting stations being connected to a single recorder and all controlled to send their data to the recorder in sequential operation.

Another object of the invention is to reduce the cost of cost accounting and information collecting by eliminating timekeepers and other clerical workers from the job of collecting such data.

Another object of the invention is to increase the speed of accounting and production recording without changing the principles of the accounting procedures.

Another object of the invention is to transmit and record data which can be used by any accounting system or with any conventional office equipment, such as punched card systems.

Another object of the invention is to adapt a transmitter-receiver of accounting data for business offices where the number of employees may be as few as 100 or as many as desired.

The invention includes a number of data transmitting stations all connected by individual wires and common cables to a central receiver-recorder. Another version of this invention may substitute high frequency wire transmission or microwave radio transmission for the direct wire connections.

The invention includes a first series of electrical contact assemblies which are operated by a key or other data handling device, a second series of electrical contact assemblies which are permanently set or manually adjusted to transmit desired information, and a third set of electrical contact assemblies which are operated by a synchronous motor to record the time. The device also includes a transmitter stepping switch which transmits numerical data in code to a series of five conductors so that the data may be sequentially recorded on a tape or transmitted to a distant station. The device also includes a receiver-selector stepping switch which sequentially connects any one of a number of transmitter stepping switches to a power source.

For a better understanding of the present invention, together with other and further objects thereof, reference is made to the following description taken in connection with the accompanying drawings.

FIGS. 11 to 18, inclusive, when properly joined, form a schematic diagram of connections of the entire data transmitting system but with some of the circuits shown in block form.

Figure 5:
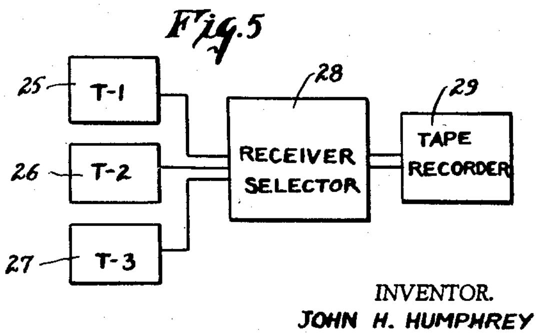
FIG. 5 is a diagram in block form showing how a number of transmitting stations may be combined with a single receiver and paper tape punch, or other type of recorder computer input.
Figure 19:
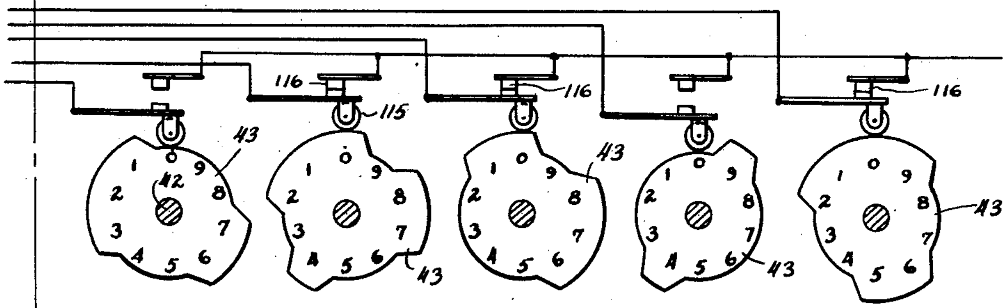

FIG. 19 is an exploded view of the cam switches employed in the transmission system shown in FIG. 5 and also in the multi-contact switch shown in FIG. 23.

Figure 6:
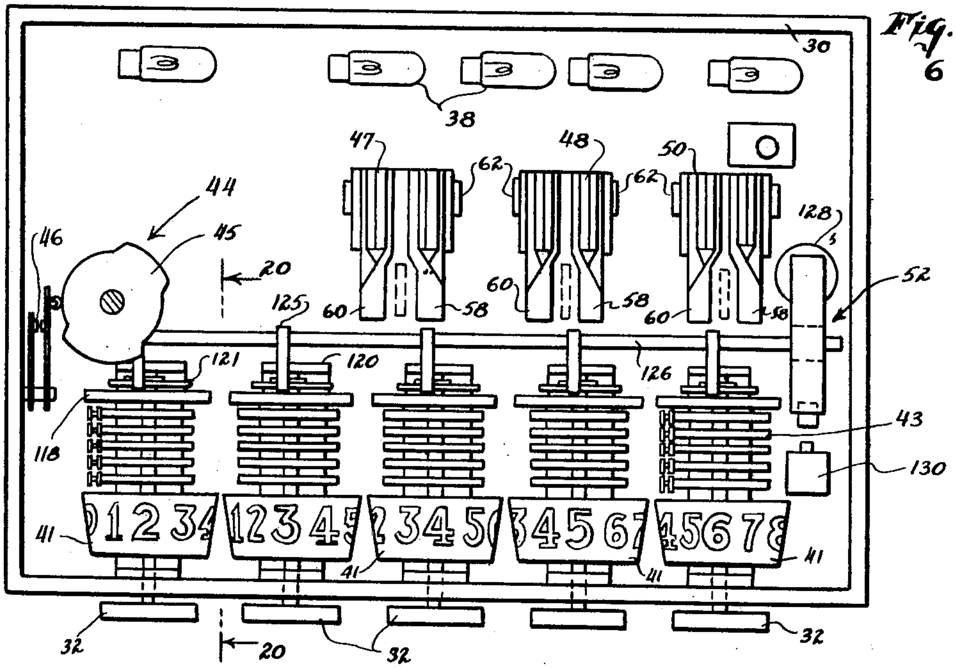
FIG. 6 is a plan view of the transmission station, with the cover removed, showing the dial switches, the key operated switches, and the lamps used to indicate when the device is in operation.
Figure 7:
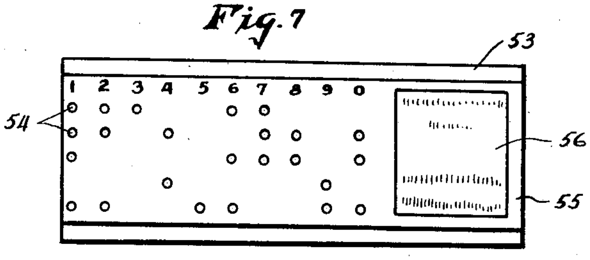
FIG. 7 is a plan view of a metal data plate which may be used instead of the key shown in FIG. 4.
Figure 8:
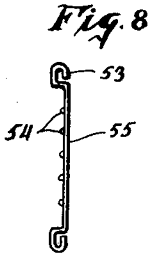
FIG. 8 is an end view of the data plate shown in FIG. 7.
Figure 20:
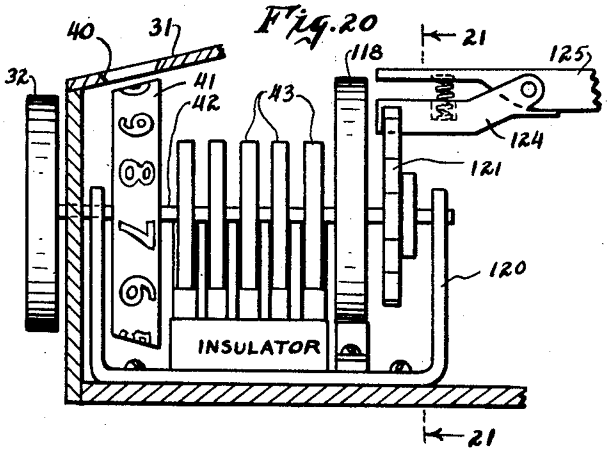

FIG. 20 is a side view, to an enlarged scale, with some parts in section, of the multi-contact switch shown in FIG. 6, and may be considered a sectional view taken along line 20—20 of that figure.

Figure 21:
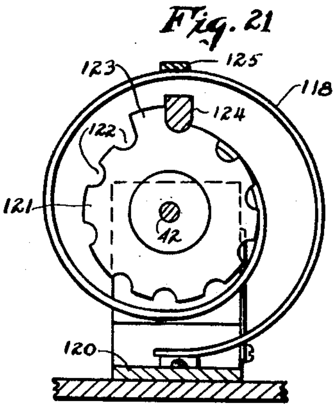

FIG. 21 is a cross sectional view taken along line 21—21 of FIG. 20 and shows the return spring and detent associated with the multi-contact switch.

Figure 22:
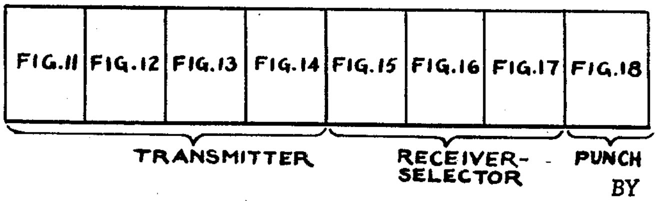

FIG. 22 is a diagram showing how FIGURES 11 to 18 should be combined in order to produce the complete wiring diagram of the transmission device.

FIG. 23 is a top view of the time-emitter circuit.

FIG. 24 is a cross sectional view taken along line 24—24 of FIG. 23 and shows the snail cam and its associated ratchet gear for changing the numerical time designations in the time-emitter assembly.

FIG. 25 is a cross sectional view of the time-emitter brake and is taken along line 25—25 of FIG. 23.

Figure 15:
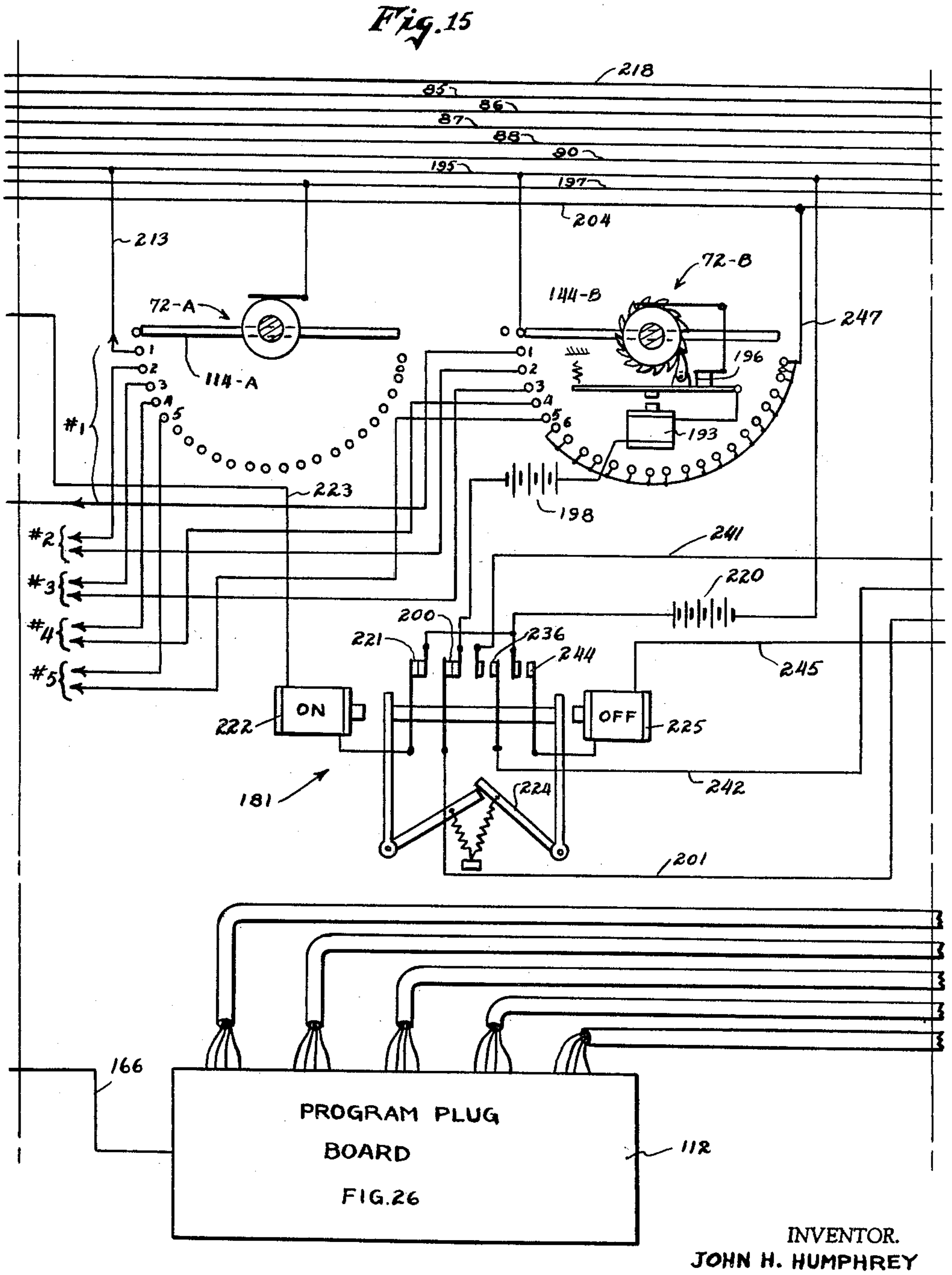
Figure 26:
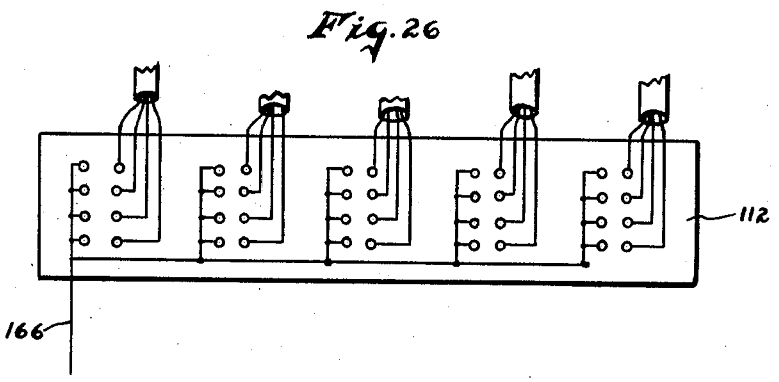

FIG. 26 is a wiring diagram showing the details of the program plug board shown in block form in FIG. 15.

Figure 27:
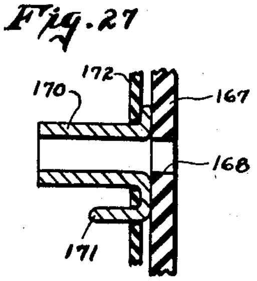

FIG. 27 is a cross sectional view of one of the jacks used in the plug board shown in FIG. 26.

Figure 28:
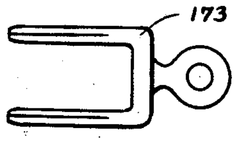

FIG. 28 is a plan view of one of the connectors or plugs used in conjunction with the plug board shown in FIG. 26.

Figure 29:
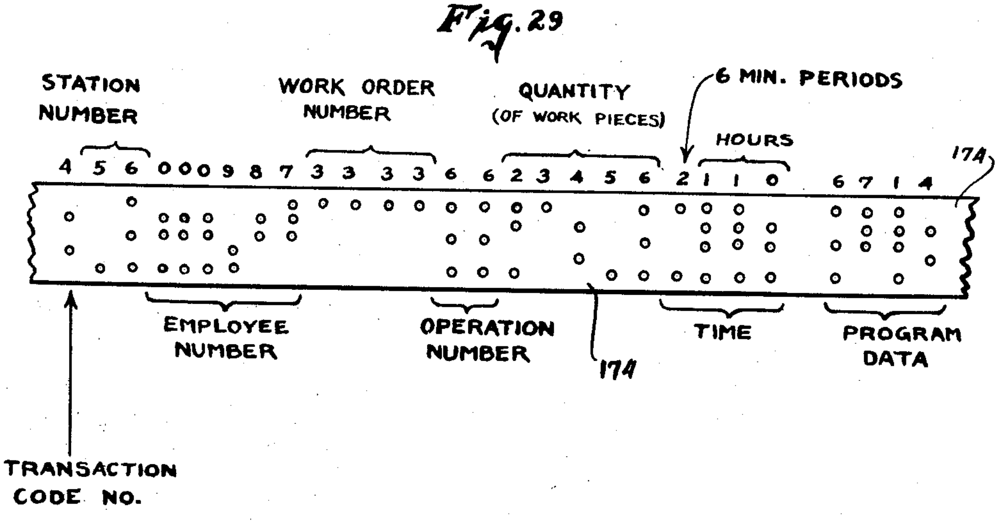

FIG. 29 is a plan view of a portion of the telegraph tape showing the various bits of information recorded therein.

Referring now to the drawings, the complete system is shown in FIG. 5 where a number of transmitter circuits 25, 26, and 27 are connected to a receiver-selector circuit 28, which in turn controls a tape recorder 29. The system is not limited to three transmitting circuits, as many as fifty or more may be used with a single recorder.

Figure 1:
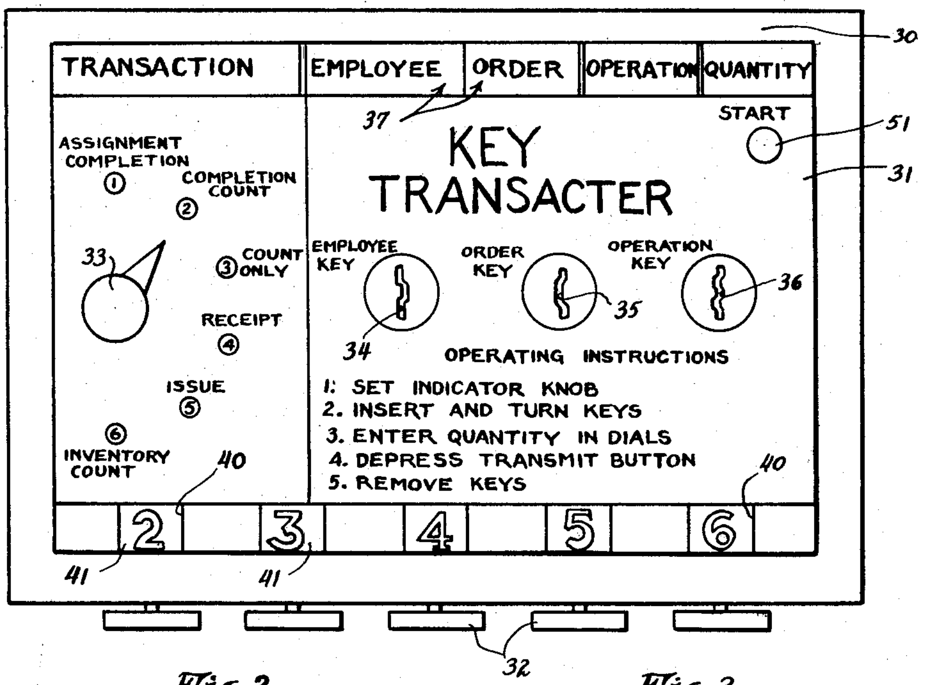
FIG. 1 is a plan view of the transmission station where data may be entered by an operator and controlled to transmit such data to a central station.

The transmission circuit is installed in a box 30 (see FIGS. 1 and 6) having a top panel 31 and adjustable knob 33 is provided for selecting the transaction number. The transactions indicated are for purposes of example only. Various combinations of transactions and their related codes to be transmitted will be employed as desired. Three key slots are formed in panel 31, one for the employee key 34, a second slot 35 for the order key, and a third slot 36 for an operation key. Other models may consist of fewer or more than three key slots. On the upper portion of the panel are a series of translucent areas 37 which light up when lamps 38 underneath are lighted. At the bottom portion of the panel are a series of five cut-out portions 40 which show numerals on a series of conical dials 41. These dials are secured to shafts 42 (see FIGS. 19, 20, and 21) which are turned when knobs 32 are turned to position cams 43. The details of the dial switches will be discussed later.

Figure 13:
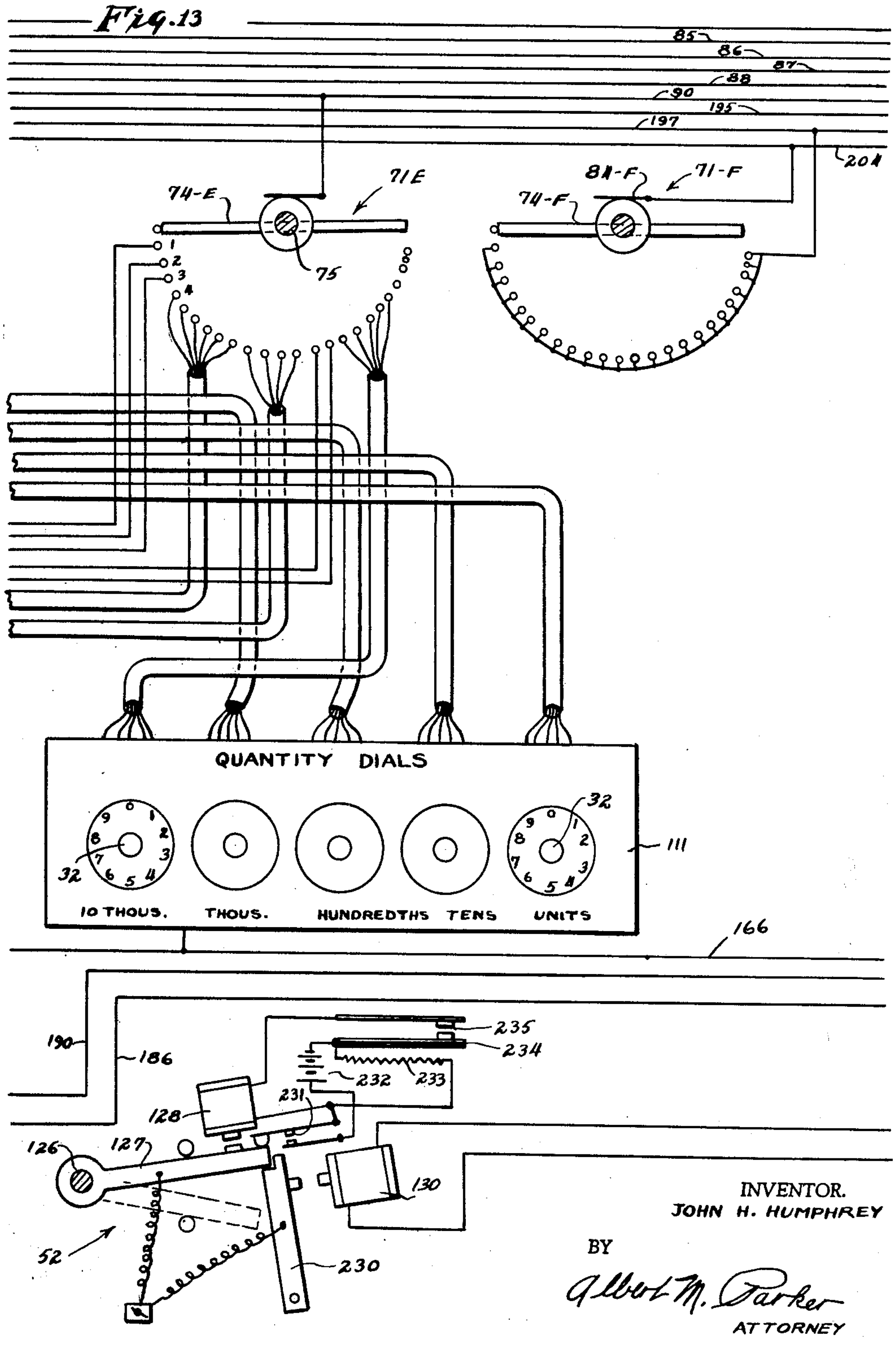

Transmission box 30 also contains a multi-contact dial switch 44 comprising cams 45 and contacts 46. Three sets of key-operated contacts 47, 48, and 50 are positioned in the box underneath the three key slots 34, 35, 36. A start button 51 is mounted on the panel for starting the operation by a momentary contact and a magnet controlled detent system 52 is installed to hold shaft 42 in its adjusted position while data is being recorded. Details of the detent system 152 are shown at the bottom of FIG. 13.

Figure 2:
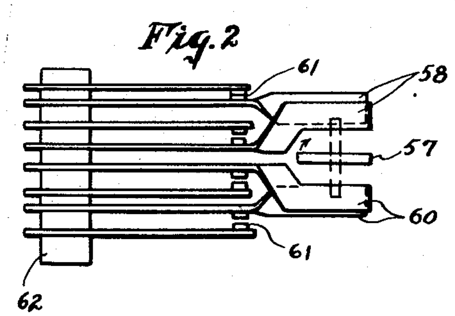
FIG. 2 is a side view of an electrical switch having a plurality of contacts and operated by a metallic key.
Figure 3:
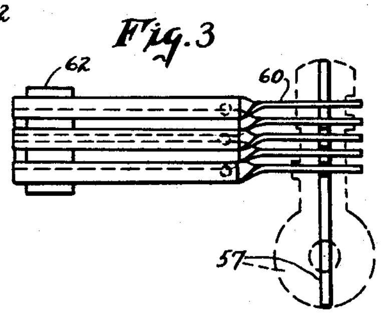
FIG. 3 is a top view of the switch shown in FIG. 2.
Figure 4:
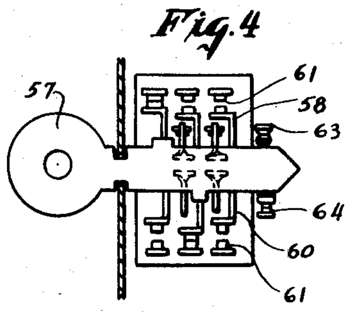
FIG. 4 is an end view, partly in section of the switch shown in FIG. 2 with a key in its operating position.

While the operation of the transmitter depends upon the insertion of three keys, alternate devices may be used to make the proper contacts within the machine. Some of these devices are shown in FIGS. 7, 8, 9, and 10, where a metallic plate 53 contains extrusions 54, formed from the main plate 55 in accordance with the usual five-hole telegraphic code. When such a plate 53 is used as an employee designation, the plate may include a small label 56 having printed thereon, the name and number of the employee and in some cases his photograph. FIG. 10 shows another form of metallic plate where serrations 59 cut in the edge of the plate furnish the required coded information. FIGS. 2, 3, and 4 show the structure used to close the electrical contacts when a key 57 is placed within the proper slot and turned 90 degrees. This set of contacts includes a plurality of fingers 58 and 60 which extend into the space normally occupied by a key. The fingers 58 and 60 are insulated extensions of flexible leaf springs which carry contacts 61, normally open, and closed only when the key 57 is inserted and turned. The leaf springs are secured to an insulator block 62 mounted adjacent to panel 31.

In addition to closing a predetermined number of contacts, key 57 is arranged to close two other contacts 63 and 64 which make contact with the key shank at its end portion. One of these contacts 63 lights a lamp 38 under the panel and shows that the key has been properly entered and turned. The other pair of contacts 64, when desirable, is in series with the main operating switch and this circuit thereby insures that no information will be transmitted unless all the desired keys have been entered and turned.

Figure 9:
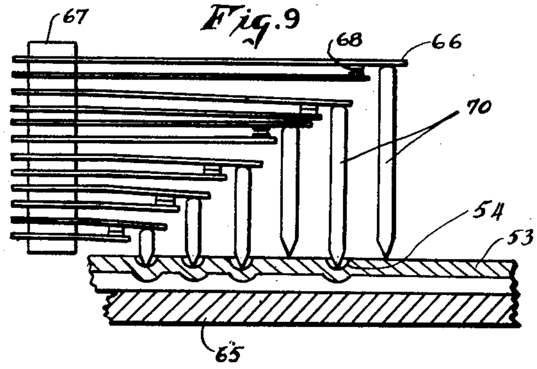
FIG. 9 is a side view, partly in section, showing the method of sensing the data from the plate.
Figure 10:
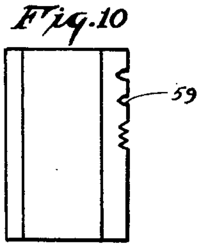
FIG. 10 is a side view of another form of metal data plate.
Figure 11:
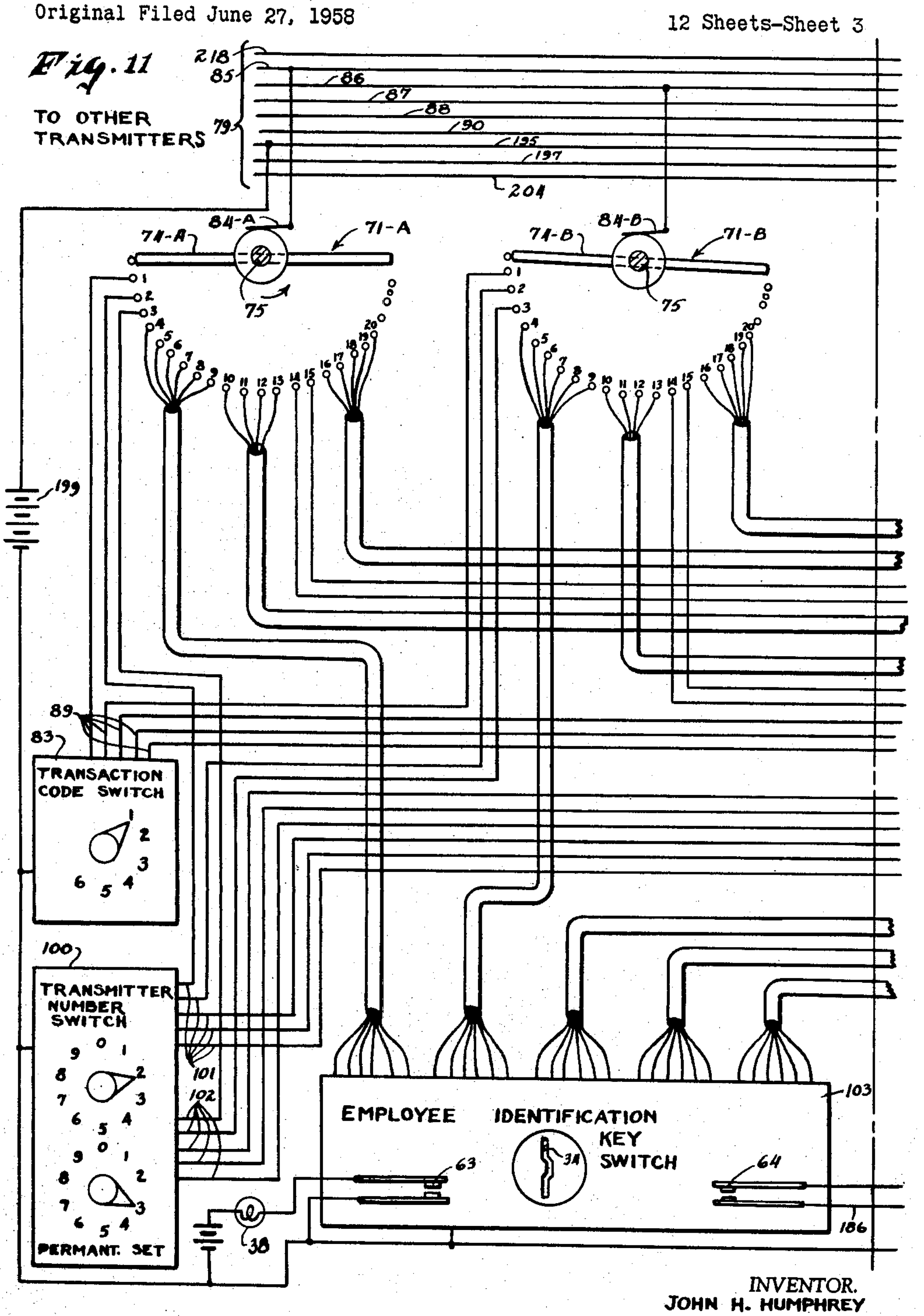
Figure 12:
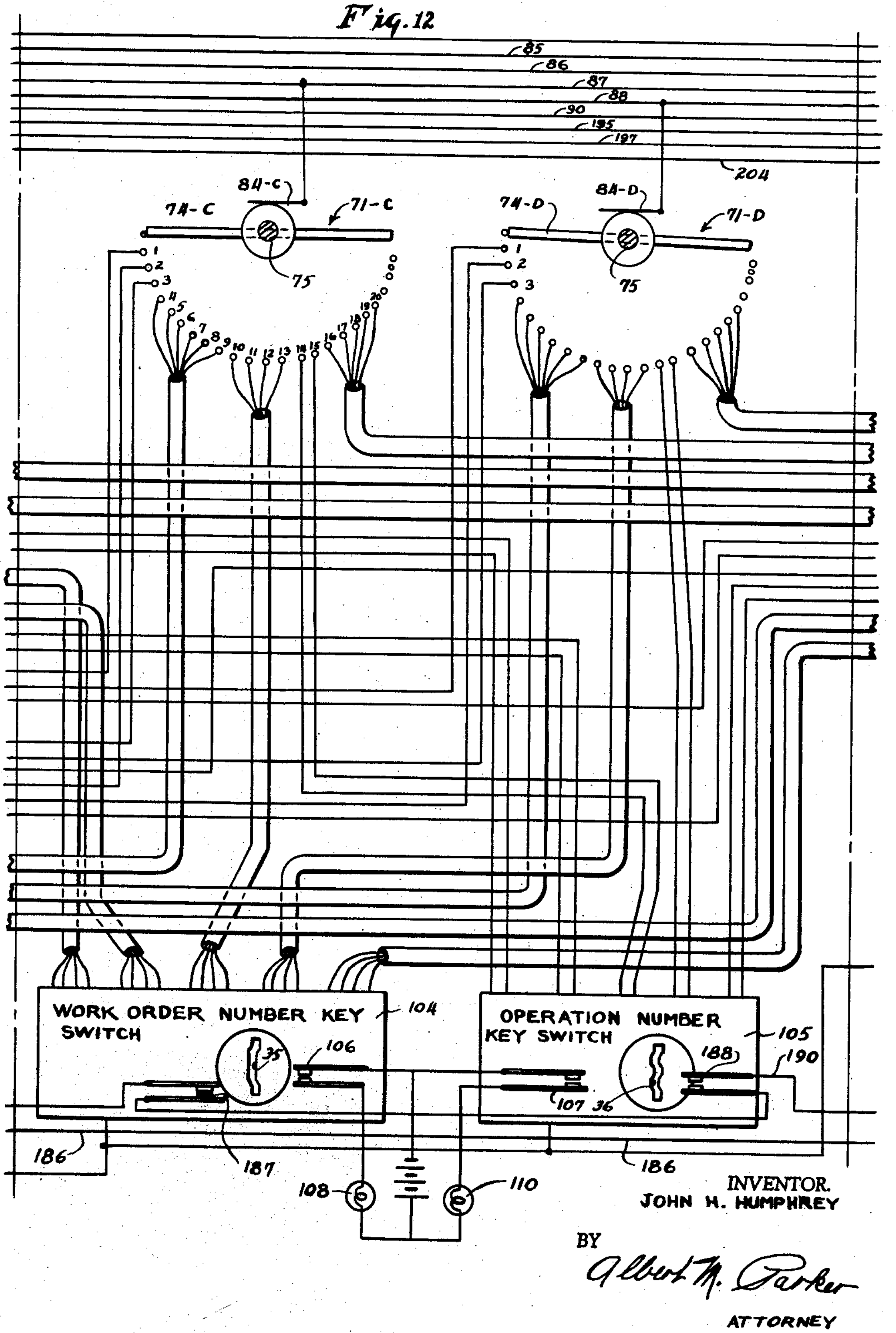

The sensing arrangement shown in FIG. 9 contains a base 65 for supporting the metal data bearing device 53 and includes a plurality of leaf springs 66 secured to an insulator block 67 and supporting a plurality of contacts 68. The leaf springs 66 are actuated by a series of pins 70 which make contact with the extrusions 54 in plate 53 and close the contacts whenever an extrusion is sensed. It will be obvious that arrangements can be made for sensing either the depressions formed by the extrusions as shown in FIG. 9 or by sensing the elevations formed on the other side of the plate by a similar sensing mechanism.

The schematic diagram of connections is shown in FIGS. 11 to 18, inclusive, and includes three stepping switches 71, 72, and 73, a plurality of contact switches, and several control circuits. The transmitter stepping switch 71 includes eight banks of switch elements, each bank having 25 contacts, and a rotating arm 74 which is arranged to make sequential contact with all 25 contact positions during one-half a revolution. The first five banks of switches are connected in the transmission circuit to transmit, respectively, the five code positions necessary for the five hole telegraphic code. It will be obvious that a system using a six, seven, or eight hole telegraphic code will employ six, seven, or eight of these switch banks instead of five. The other three contact banks are employed as control units and their use will be discussed during the operation of this control element. All the arms 74 are secured to a common shaft 75 which is rotated in increments by a stepping magnet 76 in conjunction with a return spring 77. Magnet 76, when actuated, attracts an armature 78 and repositions a ratchet pawl 80. When this is done a pair of contacts 81 is opened by the movement of armature 78, the current is cut off, and spring 77 moves the pawl 80 and ratchet wheel 82 together with shaft 75 one twenty-fifth of a half-revolution, thereby moving all the arms 74 to a new contact position. This embodiment of a stepping switch and its actuation are old in the art and have been described in prior publications.

Figure 18:
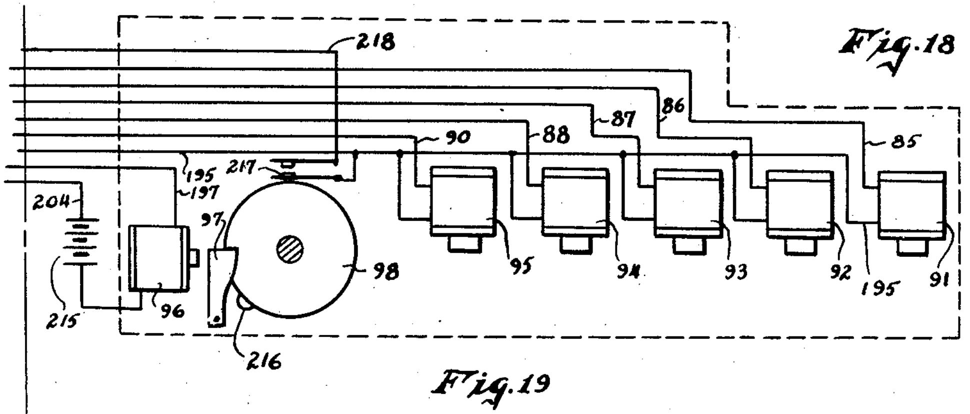

A single stepping switch 71 is mounted in each transmitter box 30, together with all the circuit components shown in FIGS. 11 to 14, inclusive. As shown in FIG. 22, the circuit for the "Receiver-Selector" is included in FIGS. 15, 16, and 17, while the tape punch circuit is shown in FIG. 18. Additional transmitters are connected to the system by joining conductors 79 (FIG. 11) and two conductors (FIG. 15), designated by the transmitter number, to a similar wiring system in the additional transmitters.

The first bit of information to be recorded in the tape is the number of the transaction. This number is set by the operator when he adjusts knob 33 to its proper position. The information sent to the recording device is a number from one to six, in this example, and its meaning must be interpreted when the record is transcribed or decoded. It will be noted from the diagram that five wires 89 are connected between the transaction code switch 83 and the first contact on switch banks 71A, 71B, 71D, and 71E. Current through these five wires and arms 74 are communicated through brushes 84 to conductors 85, 86, 87, 88, and 90, these five conductors sending current through five solenoids 91, 92, 93, 94, and 95. These solenoids are a part of the telegraph tape punch and set up interponents which act to punch holes in the tape whenever a magnet 96 is actuated and moves a pawl 97 from contact with a one-revolution clutch 98. The one-revolution clutch during its first half revolution punches holes in the tape to represent the number sent to it and during the second half of its revolution the tape is advanced one space so as to be ready for the next perforation.

Since many transmitter circuits may be connected to the transmitting-recording system, all arranged to send similar data to a single recording punch, an identifying transmitter number must be recorded in the tape each time a transmitter circuit sends its data. The transmitter number is permanently set by controls underneath the panel and not available to the operator. This circuit 100 is shown in block form in FIG. 11 and is connected by five conductors 101 to the second contact points on each of the first five banks of stepping switch 71. Since the transmitter number may be greater than nine, a second series of five conductors 102 is connected between circuit 100 and the third contact points in each of the five banks of switch 71. With this arrangement, as arms 74 are progressively moved from contact points 1 to 2 to 3, the number of the transmitter will be sent to the tape perforator in code and perforated therein.

The single dial on the transaction code switch and the two dials on the transmitter number switch are identical and each comprises five cams 43 secured to a common shaft as indicated in FIG. 19. As the cams are rotated they cooperate with cam followers 115 which open or close electrical contacts to transmit coded information.

When arms 74 are progressively stepped from contact points 4, 5, 6, 7, 8, and 9, six numbers are sent over conductors 85, 86, 87, 88, and 90, to the tape punch and six numbers are recorded therein. These six numbers originate from key switch 103 and identify the employee, all the switches being operated by the key which has been entered into key slot 34 and turned one-quarter revolution. In a similar manner, a work order number comprising four digits is sent from key switch 104 (FIG. 12) to the first five banks of stepping switch 71 and these numbers are sent to the tape punch as the arms 74 make contact with points 10, 11, 12, and 13. Key switch 104 is controlled by the work order key when inserted into slot 35 and turned.

The operation key switch 105 is controlled by a key inserted into slot 36 and two digits are sent to the tape as the arms 74 make contact with points 14 and 15.

In order to give visual indication of the operating control, switches 106 and 107 are positioned along side the key slots 35 and 36 in a manner similar to contacts 63 shown in FIG. 4. When these contacts are closed lamps 108 and 110 are lighted behind panels 37 and give assurance to the operator that the proper contacts have been made.

Figure 16:
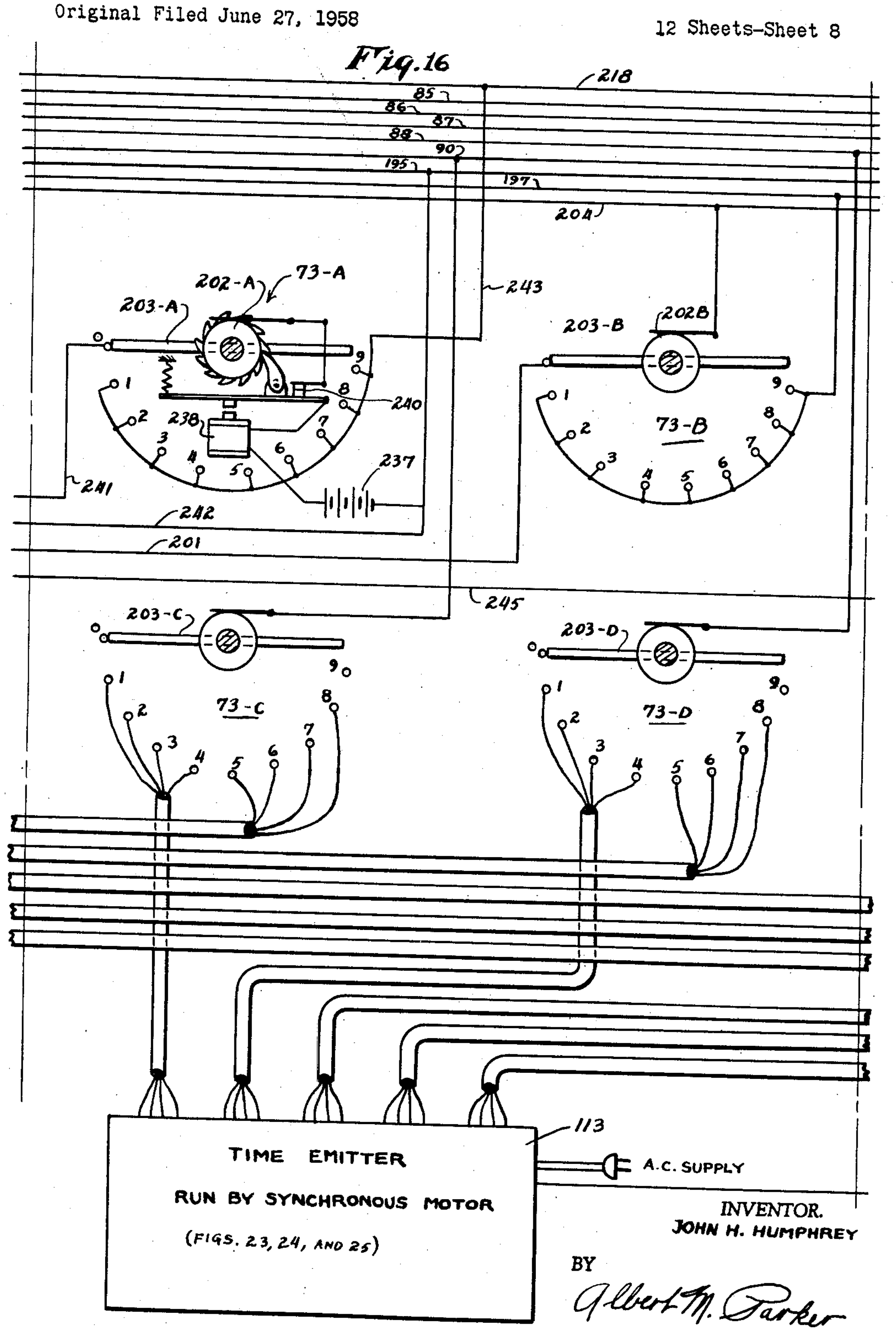
Figure 17:
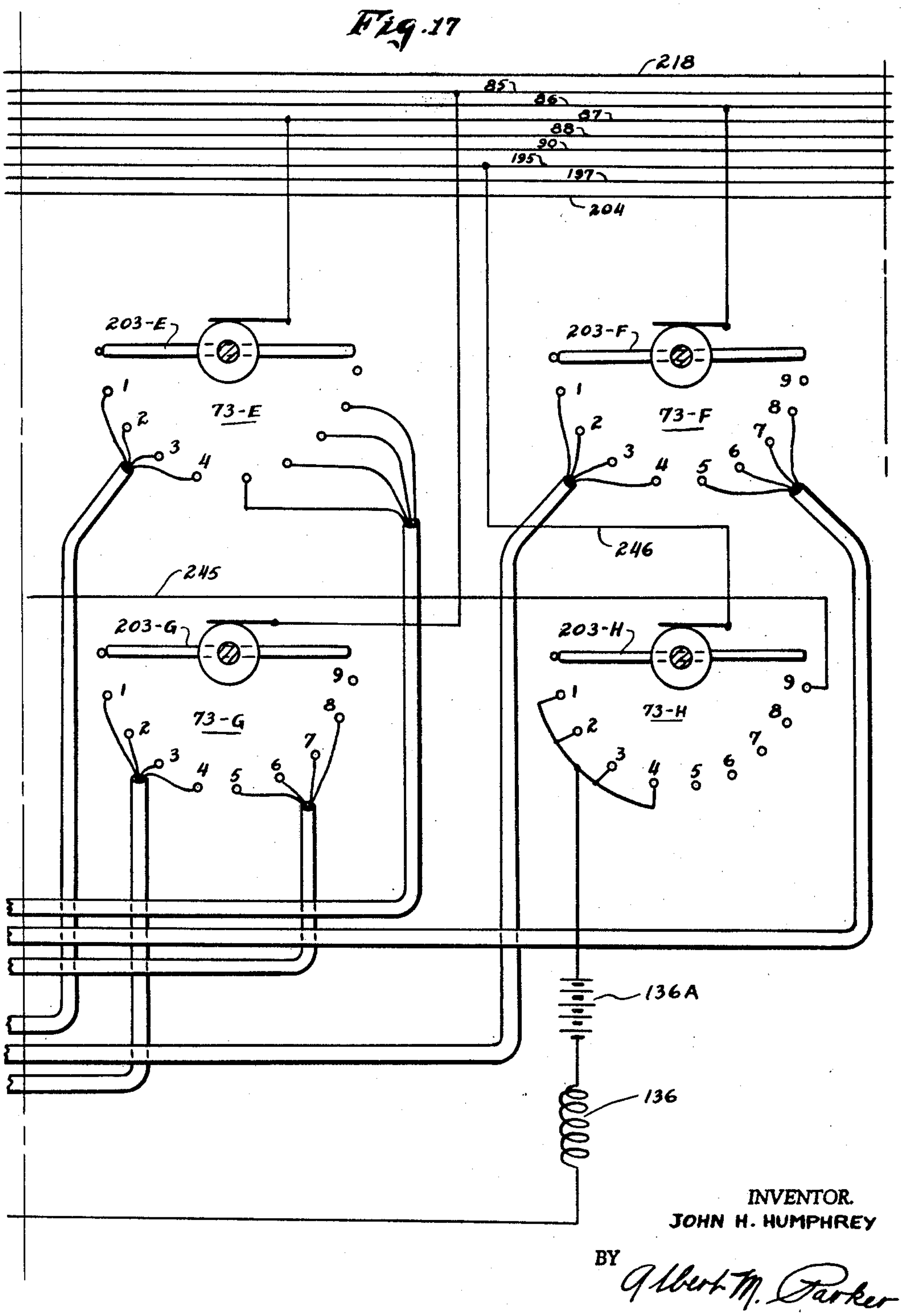

The dial switches controlled by cams 43 (FIG. 6) and containing dials 41 are operated by knobs 32 to represent the number of work pieces needed for a manufacturing job or the number which have been issued to an assembly department. Since the number of these pieces will vary for each condition and since the number is known only to the operator, the operator himself, must set the knobs to transmit the desired information to the tape. This collection of dials is indicated in the wiring diagram by block 111 (FIG. 13) and this set of switches is also connected to the first five banks of stepping switch 71, occupying contact points 16, 17, 18, 19, and 20. As soon as the contact arms 74 have been moved from point 20 to 21, they are automatically stepped to the zero position where the action of this stepping switch stops and waits until another operation is commenced. At this point, stepping switch 73 starts its operation and enters data into the telegraph tape from the program plug board 112 (FIG. 15) and the time emitter 113 (FIG. 16). Conductors from each of these switching circuits are connected to contact points one to four, and five to eight, respectively, on banks 73–C, 73–D, 73–E, 73–F, and 73–G.

With the recording of the time program data sent from the central receiver, the operation is complete and the machine is normalized to await another operation. However, if there are other transmission circuits connected in the system and if they are readied to transmit data, stepping switch 72 will then move its arms 114 in sequence to make contact with all the points stopping at the contact point connected to a transmission circuit ready for operation. If there are no circuits ready for operation, arms 114 will make a complete half-revolution and return to the zero position shown in FIG. 15. The circuits which control stepping switch 72 will be discussed in detail later.

Details of the switches which make up composite switch 111 (FIG. 13) are shown in FIGS. 19, 20, and 21. Each of these switches has a common shaft 42 and five cams 43 secured thereto. Each of cams 43 have raised portions which cause cam followers 115 to close switches 116 in accordance with the standard five hole telegraph code.

A dial 41 is also secured to the shaft 42 and has numbers printed on its outer surface which show through hole 40 to indicate the value of the code designation. Shaft 42 is secured to one end of a spiral spring 118, the other end of which is fastened to a bracket 120 which supports the two ends of the shaft. Spring 118 is resiliently stressed to turn the shaft in a counter-clockwise direction as viewed from the knob end of the shaft. Also secured to shaft 42 is a detent wheel 121 formed with ten indentations 122 and one extending portion 123 which acts as a stop and prevents the motion of the cams from moving to a position below zero or to a position greater than nine. Cut-out portions 122 cooperate with a resiliently mounted detent 124 which is pivotally mounted on an arm 125. The construction of the cut-out portions 122 and their cooperating detent 124 is such that the operator can move the shaft and detent wheel in either direction, with or against the force of spring 118. However, when properly positioned, the switch remains at its set position until detent 124 and arm 125 are lifted by another mechanism. The detent wheels 12, spiral springs 118, and arms 125, are also shown in FIG. 6. This view shows all five arms secured to a transverse shaft 126 which is rotatably mounted in bearings (not shown) within the transmitter box 30. Shaft 126 is controlled by a mechanism 52 (see FIG. 13) which includes an electromagnet 128 for disengaging arms 125 and detents 124

(FIGS. 20 and 21) and an electromagnet 130 which unlatches an arm 127 to again rock shaft 126 and re-engage detents 124.

The time-emitter circuit and structure are shown in FIGS. 23, 24, and 25. A synchronous motor 131, connected to a source of alternating current having a stabilized frequency, is connected to a gear box 132 which runs a shaft 133 at ten revolutions per hour or one complete revolution for each of the six minute time intervals to be recorded on the tape. It will be obvious that other time intervals may be used and instead of recording hours, a coded number may be used for each time recording and the actual time obtained from it. Secured to shaft 133 is a flexible coupling 134, the right hand portion of which may be momentarily stopped in its rotary movement by a brake 135. The brake is operated by a solenoid winding 136 and power source 136A connected to the operating circuit (see FIG. 17) and is energized each time stepping switch 73 is operating on contacts 1, 2, 3, and 4 of 73H, FIG. 17. The coupling (FIG. 25) comprises a disk-like member 137 secured to shaft 133 and having a radial limit surface 138. An axially aligned second disk 140 is secured to shaft 141 which is connected to a snail cam 142 and a gear box 143 which reduces the number of revolutions to one-tenth of the speed produced by gear box 132. Disk 140 includes a stub shaft 144 which makes contact with the limit surface 138. Disks 137 and 140 are resiliently connected by a strong spring 145.

The action of the above described flexible coupling 134 is as follows: When the rotating arms of stepping switch 73 make contact with switch points numbers 1, 2, 3, and 4, the magnet 136 is energized and the brake 135 is applied to disk 140, holding it and shaft 141 in a stationary position. This action stops all movement of the time-emitter, snail cams, and associated contacts until the stepping switch arms have moved to point 5 thereby completing the transmission of time information to the tape perforator. As soon as the last bit of information has been punched in the tape, the brake surface 135 is removed from disk 140 and spring 145 pulls disk 140 to the position where shaft 144 is again in contact with limit surface 138. In this manner, the rotation of the synchronous motor and its associated gear 132 are not arrested and the total elapsed time information as furnished by the motor is not subject to error. The time-emitter snail cams and associated contacts are stopped in order to prevent an error due to a change of contacts during a reading-out operation.

Gear box 143 is connected to a snail cam 146 and a third gear box 147 which again reduces the velocity of rotation by one-tenth. In like manner, this gear box is connected to a third snail cam 148 and a fourth gear box 150. Gear box 150 reduces the rotational velocity by ten and turns a fourth cam 151.

The result of this mechanism is the rotation of four snail cams 142, 146, 148 and 149. FIG. 24 is a detailed showing, taken on section line 24—24 of FIG. 23, of snail cam 146 and how it operates to change the hour contacts 152 by rotating the five cams 153 to produce a coded representation which is recorded by the tape recorder. The cams 153 are similar to the cams 43 shown in FIG. 19 and the contacts 152 are similar to contacts 116 of the same figure. Cams 153 are secured to sleeve 154A which turns on shaft 154. Sleeve 154A is secured to a ratchet wheel 155. In a similar manner, a collection of five cams 156 is turned by ratchet 157, to transmit the six minute intervals, and cams 158 and 161 are secured to ratchet wheel 160 and 162 to transmit the tens and hundreds digits of the number of hours. Each ratchet wheel and its associated cams are secured to sleeves and rotate independently of the other ratchet wheels and their cams; and furthermore, each ratchet wheel may be turned by hand independently of the other ratchet wheels when it is desired to reset the cams at the end of the month, or, if the machine does not run during the night, at the start of each day.

Referring again to FIG. 24, as the snail cam 146 revolves, a cam follower 163 is slowly moved to the left against the action of spring 164 until pawl 165 engages the next tooth in ratchet wheel 155. When snail cam 146 continues to rotate, the came follower 163 falls to a new position shown in dotted lines in the figure and the ratchet wheel 155 is moved one tooth to reposition its associated cams and contacts to transmit another coded value. Ratchet wheels 155, 160, and 162, have ten teeth to represent the ten units, tens, and hundreds digits of the hours.

FIG. 26 is a wiring diagram showing the connections for the program plug board 112 shown in block in FIG. 15. The plug board has twenty terminations from five cables which are connected to contact points on stepping switch 73. The plug board is preset by inserting plugs 173 (see FIG. 28) which may be inserted into jacks to make connection with any one of the twenty wires connected to the stepping switch and the common return wire 166. One form of jack is shown in FIG. 24 where an insulated front panel 167 contains a plurality of holes 168, each hole coinciding with a hole in a metallic jack 170 having an extension 171 for connection to a wire conductor. The jacks 170 are held in place by a subpanel 172 and these jacks are arranged to receive the double pronged plug 173, shown in FIG. 28.

The completed record is shown in FIG. 29 where a paper tape 174 contains all the data transmitted to the telegraph perforator in the order in which it was received.

Figure 14:
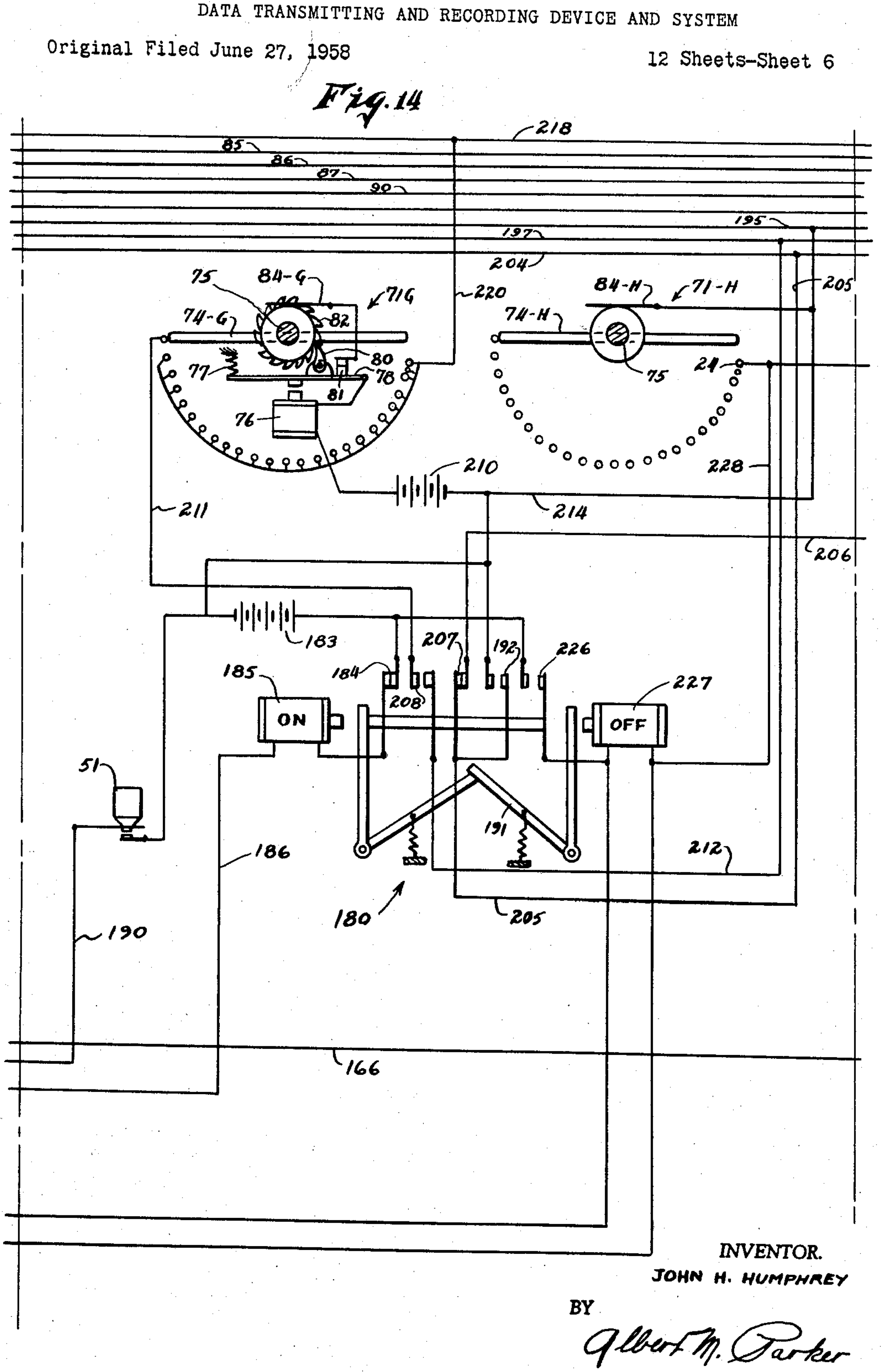

Having now indicated the general utility and function of the system, the detailed operation of the circuit will now be described. When the circuit (FIGS. 11 to 18) is in its non-operating condition, switch 51 is open and locking relays 180 and 181 are in their OFF position as shown in FIGS. 14 and 15. All three stepping switches 71, 72, and 73, are in the start position with the contact arms on the "0" contact.

When the operator sets the dials and turns the keys, as described above, and then closes the "start" switch 51 (FIG. 14) relay 180 is actuated to its ON position by a circuit which can be traced from the switch 51, through source of potential 183, contacts 184, relay winding 185, conductor 186, to contacts 64 (FIG. 11), contacts 187 and 188 (FIG. 12), over conductor 190, to the other side of switch 51. When relay 180 is actuated, contacts 184 are opened but the relay remains in its actuated condition because of the mechanical locking arm 191.

Actuation of relay 180 closes contacts 192 and completes a circuit through winding 193 of stepping switch 72. This circuit may be traced from contacts 192, over conductors 214 and 195, to the "0" contact in bank 72–B, then through arm 114–B, contacts 196, winding 193, source of potential 198, contacts 200 of relay 181 which is in its OFF position, over conductor 201, to the "0" contact in bank 73–B (FIG. 16), thence through arm 203–B, over conductors 204 and 205 back to contacts 192. This circuit causes stepping switch 72 to move from its "0" contact to contact "1."

When stepping switch 72 is advanced to its "1" contact position, the above described circuit is broken and the action stops. However, there is a second possible actuating circuit which may keep this stepping switch moving until it arrives at a contact connected to a transmitter switch (similar to 180) which is actuated. It will then stop at that contact. This actuating circuit may be traced from battery 198, through winding 193, contacts 196, arm 114–B, "1" contact, conductor 206, contacts 207, FIG. 14, (when relay 180 is OFF), conductors 205 and 204, arm 203–B, (FIG. 16), conductor 201, contacts 200, and back to battery 198. Since relay 180 has been actuated, contacts 207 are open and arms 114–A and 114–B are stopped at contact "1."

Stepping switch 71 with 8 banks of contacts is started by the closing of contacts 208. This completes a circuit which may be traced from source of potential 210 (FIG. 14), through winding 76, contacts 81, brush 84–G, arm 74–G, conductor 211, contacts 208, conductors 212 and 197, arm 114–A (FIG. 15), contact "1" to which point the arm has been moved, conductors 213 and 195, and back to source of potential 210 (FIG. 14) by way of conductor 214.

The above described circuit moves the arms 74 only from the "0" contact point to "1." At this position the first five arms 74–A through 74–E transmit the coded number from code switch 83 (FIG. 11) to the punch solenoids. One of these circuits may be traced from source of potential 199, (FIG. 11) through the contact switch 83, the first of the five wires 89, contact "1" on stepping switch 71–A, over conductor 85 to solenoid 91 (FIG. 18), back over conductor 195, to the other side of potential source 199. At the same time, arm 74–F (FIG. 13) completes a circuit which sends current through solenoid 96, (FIG. 18) to actuate arm 97 and start the one-revolution clutch 98 to operate the punch and record the coded number in the tape. This circuit may be traced from source of potential 215, through solenoid 96, over conductor 197, to all the contacts "1" through "24" of switch bank 71–F (FIG. 13), to arm 74–F brush 84–F, conductor 204, and back to source of potential 215.

When the one-revolution clutch 98 revolves, a cam 216 on the clutch engages contacts 217, closing them momentarily and completing a circuit which may be traced from source of potential 210 (FIG. 14), over conductors 214 and 195, to contacts 217 (FIG. 18) just closed by cam 216, thence over conductors 218 and 220 (FIG. 14), to all the contacts "1" through "24" on bank 71–G, arm 74–G, contacts 81, winding 76, and back to source of potential 210. The completion of this circuit advances all the arms 74 on stepping switch 71 and transmits a second coded signal to the punch solenoids.

The above described action continues until all the data set in the transmitter 30 has been transferred to the punch. Since the stepping switches are much faster than the punch, the arms 74 will be positioned before the punch mechanism punches the holes in the tape. The arms 74 are moved to their next contact point while the paper tape is being advanced to its new position.

When stepping switch 71 has advanced its arm 74 to make contact with the last point (24) in the series, arm 74–H (FIG. 14) completes a circuit which actuates relay 181 and turns it on by a circuit which may be traced from source of potential 220 (FIG. 15), through contacts 221, relay winding 222, conductor 223, contact 24 on bank 71–H (FIG. 14), arm 74–H, brush 84–H, to conductor 195, and back to source of potential 220 (FIG. 15). Arms 74 of switch 71 continue to move to the "0" position due to the control circuit of 71–F (FIG. 13) and only a momentary current pulse is sent through relay winding 222 to actuate its armature. However, when in the ON position the armature is retained by mechanical lock arm 224 until current is sent through the second OFF winding 225.

At the same time that relay 181 is turned ON relay 180 is turned OFF by a circuit which may be traced from source of potential 183 through contacts 226, OFF relay winding 227, conductor 228, to the 24 contact point of bank 71–H, arm 74–H, brush 84–H, conductor 214, and back to source of potential 183. This circuit actuates the OFF armature and normalizes the relay. It will be noted that winding 130 (FIG. 13) is connected in parallel with winding 227 and at the same time relay 180 is normalized, winding 130 attracts armature 230 and arm 127 is released, thereby rotating shaft 126 (see FIGS. 6 and 20) and raising arms 125 on which are mounted detents 124. This action releases all of the detent wheels 121, thereby permitting spiral spring 118 to rotate all the dials 41 and their associated cam wheels 43 to return to their zero or normal position.

When armature 230 is actuated and arm 127 rotates to the position shown in dotted lines in FIG. 13, a pair of normally open contacts 231 is closed and a heater circuit is completed which includes contacts 231, source of potential 232, and a heater element 233 positioned adjacent to a bi-metallic strip 234 on which is mounted one of a pair of contacts 235 which are in series with the source of potential 232 and restoring winding 128. As soon as contacts 231 are closed, current passes through heater 233 heating strip 234 and, in a few seconds, closing contacts 235. Current through contacts 235 energizes winding 128 and pulls arm 127 to its upper position, latching it there by means of arm 230, and again opening contacts 231. This circuit is a delay device which is triggered by a pulse from contact 24 on bank 71–H of the transmitter stepping switch and the few seconds' delay produced permits all five of the details 41 to return to their zero position.

As soon as relay 181 is turned to its ON position, an operating circuit is completed through contacts 236 (FIG. 15) which starts the third stepping switch 73 to record the time and any data set in the program plug board 112. This circuit may be traced from source of potential 237 (FIG. 16), through winding 238 of stepping switch 73, contacts 240, arm 203–A, to the "0" contact on the first bank, over conductors 241, through contacts 236 of relay 181, and back over conductor 242, to the source of potential 237. This circuit advances all the arms in stepping switch 73 from the "0" contact point to the "1" contact point.

When arm 203–A makes contact with the "1" contact point another circuit is completed which continues the stepping action and also energizes the punch to record the values of time and program. The stepping circuit may be traced from source of potential 237, through winding 238, contacts 240, arm 203–A, any of the contact points from "1" to "9," then over conductors 243 and 218 to contacts 217 in FIG. 18 (which are closed each time one-revolution clutch 98 revolves), and back over conductor 195, to the other side of source of potential 237. The punch actuating circuit may be traced from the source of potential 215 (FIG. 18) through winding 96 which actuates clutch 98, over conductor 197, to all the contact points "1" through "9" on bank 73–B of the third stepping switch 73 (FIG. 16), arm 203–B, and over conductor 204, to the other side of the source of potential 215. The punch is started as soon as arm 203–B makes contact with "1" point. Then, during the latter part of the punch operation contacts 217 are closed and all the stepping switch banks 73 are advanced one point and a second punch operation is started. During this stepping operation, switch banks 73–C, D, E, F, and G (FIGS. 16 and 17) transmit coded values of time and program inserted values to the punch solenoids 91 to 95 as previously described in connection with stepping switch 71.

When switch 73 reaches its "9" contact point no coded values are sent to the punch but the second bank 73–B actuates the punch clutch and produces a blank space on the tape. This tape advancing operation may be omitted by disconnecting the "9" contact point on bank 73–B from the common wire which connects the other points; however, it may be retained to indicate the end of one message.

When arm 203–H makes contact with the "9" point, relay 181 is actuated to return to its OFF position. This circuit may be traced from source of potential 220 (FIG. 15) through contacts 244, through the OFF winding 225, over conductor 245, to the "9" contact point on bank 73–H (FIG. 17), arm 203–H, and over conductors 246 and 195, to source of potential 220 (FIG. 15). Stepping switch 73 continues to operate and turns all the arms 203 to the "0" position at which time the operating circuit for this switch is broken and the arms 203 remain at their "0" contact points.

At this time, all the data has been transferred to the tape and the punching operation is finished. Switches 180 and 181 are both in their OFF position and stepping switches 71 and 73 are at their "0" or start contact. Stepping switch 72, however, is still at its "1" position where it has been for the entire cycle of operations. When relay 181 is returned to its OFF position a circuit is completed which advances switch 72 from its "1" contact to its "2" contact. This circuit may be traced from source of potential 198, through winding 193, contacts 196, arm 114–B, contact "1," conductor 206, contacts 207 on relay 180 (FIG. 14), conductors 205 and 204, arm 203–B in bank 73–B (FIG. 16), over conductor 201, contacts 200 in relay 181 (FIG. 15), and back to source of potential 198. From this circuit it will be obvious that switch 73 is energized only when both relays 180 and 181 are in their OFF position and when arm 203–B of switch 73 is at its "0" contact point.

FIGURE 15 shows five pairs of conductors to the five contacts of banks 72–A and 72–B, of these conductors, pairs 2, 3, 4, and 5, are assumed to be connected to four other transmitter circuits similar to the transmitter circuit included in FIGS. 11, 12, 13, and 14. Each of these four transmitter circuits contains an operating circuit similar to that described above and if there is no data to transmit (relay 180 being OFF) then each circuit will operate to advance switch arms in banks 72–A and 72–B from the "2" contact to the "3" contact, then to the "4," "5," and finally to the "6" contact point where another local circuit takes over and returns the arms to the "0" or start position. If any of the other transmitter circuits have data to transmit (their relay 180 being ON) the arms 114–A and B will stop at that position and remain there until the data has been transmitted to the punch and recorded there.

The circuit which moves arms 114–A and B from the "6" point to the "0" point may be traced from source of potential 198 (FIG. 15), through winding 193, contacts 196, arm 114–B, "6" to "24" contact points, conductors 247 and 204, arm 203–B (FIG. 16), conductor 201, contacts 200 on relay 181 (FIG. 15), and back to source of potential 198. When these arms 114–A and B arrive at their "0" position the action stops and the entire circuit is completely normalized.

The circuit and components herein described and illustrated have included several parts which may be omitted without departing from the scope of the invention. For example, some installations may not require a plug board 112 (FIG. 15) and for some applications the "Operation Number" key switch 105 (FIG. 12) may be omitted. The invention does not depend upon the exact number of contacts shown in the stepping switch banks nor on the five-hole code as shown.

After the transmitter has been started, the operator may discover that he has set in erroneous data. There is no way of stopping the operation after it has been started, so the operator will wait until the finish of transmission and then start a second operation with code switch 83 set at a code number which denotes an error. This will, in effect, cancel the wrong information.

Having thus fully described the invention, what is claimed as new and desired to be secured by Letters Patent of the United States is:

1. A data transmitter system for transmitting and recording data comprising: a plurality of transmitter stations which may be widely separated in locations distant from a central office; a receiver-selector circuit connected to all of said transmitter stations and located at the central office; a data transmitter at said central office; a data recorder also at the central office; and a plurality of data plates having data-bearing formations included thereon for representing coded data, said data plates also having groove formations built into the body of the plates for selective insertion into slots in said transmitter stations; each of said transmitter stations including a plurality of first contact assemblies for operation by said data plates, mechanical means for actuating said first contact assemblies to complete electrical circuits representing said data, and a first transmitter stepping switch having a plurality of contacts for sequential operation to said contact assemblies; said receiver-selector including a second stepping switch having a plurality of contacts connected to said transmitter stations and operable to be sequentially connected to a plurality of rotatable contact bars, and means for operating said second stepping switch to select a desired transmitter station; said data transmitter at the central office including contact assemblies representing coded values for transmission to the data recorder with the data from said transmitter, and a third stepping switch having a plurality of contacts for sequential connection to said data recorder to transmit data; said data recorder including a plurality of electromechanical means for recording said coded data in a tape.

2. A data transmitter system as set forth in claim 1 wherein said data transmitter at the central office includes a stepping switch connected between the data recorder and a plurality of contacts operated by a time controlled series of cams.

3. A data transmitter system as set forth in claim 1 wherein said data transmitter at the central office includes a stepping switch connected between the data recorder and a plurality of contacts in a manually settable plug board; said plug board adapted to store recordable data.

4. A data transmitter system as set forth in claim 1 wherein said data transmitter at the central office includes a stepping switch connected between a data recorder and a plurality of contacts operated by a motor for transmitting coded values proportional to elapsed time and an arresting means for stopping the change of said contacts during a recording operation.

5. A data transmitter system as set forth in claim 1 wherein said transmitter stations include a start switch and a start relay for initiating the operation of said first stepping switch, and circuit means for arresting said second stepping switch at contacts which connect to said transmitter station when the start relay associated with said transmitter station has been actuated.

6. A data transmittter system as set forth in claim 1 wherein each of said transmitting stations include a plurality of manually settable series of contacts, each of said series corresponding to a denominational order, each of said series controlled by a mechanical detent to remain in its set position until the transmitter operation is complete, and then each of said series controlled by a resilient means to return to its normal position.

7. A data transmitter system as set forth in claim 1 wherein said plurality of transmitter stations each includes a key lock circuit which prevents transmitter operation unless all the keys are in place.

8. A data transmitter system as set forth in claim 1 wherein plurality of transmitter stations each includes electrical indicator means associated with the transmitter circuits which provides a visual indication of the condition of the transmitter circuit.

9. A data transmitter system as set forth in claim 1 wherein said data transmitter at the central office includes a stepping switch connected between the data recorder and a plurality of cam controlled contacts, said cams rotated by a synchronous motor connected to a source of stabilized frequency, said stepping switch connected to the data recorder to record the time of the recording operation.

10. A data transmitter system for transmitting and recording data comprising: a plurality of transmitter stations which may be widely separated in locations distant from a central office; a receiver-selector circuit connected to all of said transmitter stations and located at the central office; a data transmitter at said central office; a data recorder also at the central office; and a plurality of data plates having data bearing formations included thereon for representing coded data, each of said transmitter stations having data plate selective means, said data plates having means cooperable with said selective means; each of said transmitter stations including a plurality of first contact assemblies for operation by said data formation on said data plates, means for actuating said first contact assemblies to complete electrical circuits representing said data, and a first transmitter stepping switch having a plurality of contacts for sequential operation to said contact assemblies; said receiver-selector circuit including a second stepping switch having a plurality of contacts connected to said transmitter stations and operable to be sequentially connected to a plurality of contact bars, and means for operating said second stepping switch to select a desired transmitter station; said data transmitter at the central office including contact assemblies representing coded values for transmission to the data recorder with the data from said transmitter, and a third stepping switch having a plurality of contacts for sequential connection to said data recorder to transmit data; said data recorder including a plurality of electromechanical means for recording said coded data in a data storage means.

11. A data transmitter system for transmitting and recording data comprising: a plurality of transmitter stations which may be widely separated in locations distant from a central office; a receiver-selector circuit at the central office and connected to each of said transmitter stations; a data transmitter at said central office; a data recorder at said central office; means including a plurality of data elements bearing plates including coded data thereon, each of said transmitter stations including data plate selective means and each of said data plates including means cooperable with said data plate selective means; each of said transmitter stations including a plurality of first contact assemblies cooperable with said coded data elements on said data plates, means for actuating said first contact assemblies to complete electrical circuits representing said data, and a first transmitter stepping switch having a plurality of contacts for sequential operation of said contact assemblies; said receiver-selector at said central office including a second stepping switch having a plurality of contacts connected to said transmitter stations and operable to be sequentially connected to a plurality of contact bars, and means for operating said second stepping switch to select a desired transmitter station; said data transmitter at the central office including contact assemblies representing coded values for transmission to the data recorder with the data from said transmitter, and a third stepping switch having a plurality of contacts for sequential connection to said data recorder to transmit data for recording and storing said transmitted data.

12. A system for transmitting data at least part of which is carried by a data bearing plate, from a transmitting station remote from a central office at which transmitted data may be stored, comprising: means including a data plate bearing coded data formations thereon and including plate acceptance means thereon; a transmitter station including means cooperable with said plate acceptance means for selective acceptance of a data plate, said transmitter station including a plurality of first contact assemblies cooperable with said data formations on said data plate means, means for actuating said first contact assemblies to complete electrical circuits representing said data, and a means for sequential operation of said contact assemblies; a receiver-selector circuit means at said central office and connected to said transmitter station, said receiver-selector means including means connected to said transmitter station and operable to select said transmitter station; a data transmitter at the central office; a data recorder at said central office; said data transmitter including means representing coded values for transmission to the data recorder with data received by said receiver-selector means from said transmitter station, means operable to sequentially transmit data to said data recorder, said data recorder including means for recording said data on data storage means and connected with said transmitter station to record in synchronism with the sequential operation of said first contact assemblies.

13. A system for transmitting data from separate transmitter stations remotely located with respect to a central office and in which system the data includes coded data on a data plate and fixed and variable data introduced to the system at a transmitting station and other data introduced to the system at the central office comprising: one or more data plates bearing coded data means and having plate acceptance means thereon; transmitter stations, each including means cooperable with the plate acceptance means of the data plates for accepting the plates into operable relation with the station, each transmitter station including means operable by said coded data means to precondition electrical circuits representing said data, and first switch means for sequential connection to said electrical circuits to transmit representations of said data; receiver-selector means at said central office connected to each of said transmitter stations to receive said transmitted representations of said data and including a second switch means operable to sequentially select a transmitting station; a data transmitter at the central office including means representing said other data to be transmitted, and including a third switch means operable to transmit said other data; and a data recorder operably connected to the receiver-selector means and said data transmitter for recording on a data storage means in synchronism with said first switch means all of the data received from a selected transmitter station and said data transmitter.

14. A system as stated in claim 13 wherein each transmitter station includes a start switch and a start relay for initiating the operation of said first switch means, and circuit means for arresting said second switch means at said receiver-selector means for connecting said transmitter station thereto when the start relay associated with said transmitter station has been actuated.

15. A system as set forth in claim 13 wherein each transmitter station includes a lock circuit means preventing transmittal of data in the event a data plate is rejected by said data plate acceptance means as said transmitter station.

16. A system as set forth in claim 13 wherein each transmitter station includes a plurality of manually settable series of contacts each of said series corresponding to a denominational order, means for holding each series of contacts in position until a transmitting operation is completed, and means for releasing said series of contacts for return to their normal position.

17. A system as stated in claim 13 wherein said third switch means at said central office includes a stepping switch connected between said data recorder and a plurality of contacts operated by a time controlled series of cams.

18. A system as stated in claim 13 wherein said third switch means at said central office includes a stepping switch connected between said data recorder and a plurality of contacts in a manually settable plug board, said plug board being adapted to store recordable data.

19. A system for transmitting data from separate transmitter stations remotely located with respect to a central office and in which system the data includes coded data on a data plate and fixed and variable data introduced to the system at a transmitter station, comprising: data plate means bearing coded data formations; transmitter stations each including means cooperable with said data plate means for acceptance of said data plate means into operable relation therewith, each transmitter station including means responsive to said data formations on said data plate means for presetting circuit means to transmit said data, and first means for transmitting said coded data; receiver-selector means at said central office connected to each of said transmitter stations to receive therefrom said coded data, and including second means operable to select a transmitter station; and a data recorder at said central office operably connected to the receiver selector means for receiving said coded data therefrom and for recording said coded data on a data storage means as said first means transmits said coded data.

20. A system for transmitting data from a plurality of separate transmitting stations located away from a central office at which said data is to be available for selected processing, such as recording, storing, or further transmittal thereof, a combination of: a data bearing means having data formations thereon; a plurality of transmitting stations, each transmitting station having receptor means to receive said data bearing means, said receptor means having means cooperable with and responsive to said data formations, each transmitting station having a first switch means sequentially operable; a central office means including a receiver selector means connected with said transmitting stations to receive data therefrom, said central office means including a second switch means operably connected to said transmitting stations for selection of a transmitting station, said central office means including means for processing said data received from a transmitting station selected by said second switch means in synchronism with the transmittal of data through said first switch means.

References Cited by the Examiner

UNITED STATES PATENTS

| | | | |
|---|---|---|---|
| 1,718,914 | 6/29 | Ostline | 340—147 |
| 1,927,556 | 9/33 | Nelson | 340—147 |
| 2,150,240 | 3/39 | Nichols | 340—147 |
| 2,357,297 | 9/44 | Wack et al. | 340—147 |
| 2,918,654 | 12/59 | Hillyer | 340—150 |
| 2,970,877 | 2/61 | Parsons et al. | 346—34 |
| 2,985,368 | 5/61 | Kohler et al. | 346—17 |
| 3,022,381 | 2/62 | Pferd | 346—33 |
| 3,072,910 | 1/63 | Snyder | 346—34 |

LEO SMILOW, *Primary Examiner.*

LEYLAND M. MARTIN, *Examiner.*